(12) United States Patent
Ferron et al.

(10) Patent No.: US 8,783,947 B2
(45) Date of Patent: Jul. 22, 2014

(54) FOOD COOKING CONTAINER PROVIDED WITH A THERMAL INDICATOR

(71) Applicant: Ballarini Paolo & Figli S.p.A., Rivarolo Mantonvano (IT)

(72) Inventors: Francesco Ferron, Casalmaggiore (IT); Jacopo Ferron, Casalmaggiore (IT)

(73) Assignee: Ballarini Paolo & Figli S.p.A., Rivarolo Mantonvano (IT)

( * ) Notice: Subject to any disclaimer, the term of this patent is extended or adjusted under 35 U.S.C. 154(b) by 0 days.

(21) Appl. No.: 13/724,917

(22) Filed: Dec. 21, 2012

(65) Prior Publication Data

US 2013/0161343 A1 Jun. 27, 2013

(30) Foreign Application Priority Data

Dec. 22, 2011 (IT) ................ MI2011A2356

(51) Int. Cl.
*G01K 1/00* (2006.01)
*G01K 13/00* (2006.01)
*A47J 43/00* (2006.01)
*A47J 45/06* (2006.01)

(52) U.S. Cl.
CPC ...................... *A47J 45/068* (2013.01)
USPC .............. 374/141; 374/208; 99/342; 220/756

(58) Field of Classification Search
USPC ....................... 374/141, 208; 99/342; 220/756
See application file for complete search history.

(56) References Cited

U.S. PATENT DOCUMENTS

| | | | | |
|---|---|---|---|---|
| 3,040,579 A | * | 6/1962 | Taylor | 374/141 |
| 5,441,344 A | * | 8/1995 | Cook, III | 374/141 |
| 5,620,255 A | * | 4/1997 | Cook, III | 374/141 |
| 5,934,181 A | * | 8/1999 | Adamczewski | 99/342 |
| 6,848,355 B2 | * | 2/2005 | Cesare | 99/342 |
| 6,860,192 B2 | * | 3/2005 | Sharpe | 99/342 |
| 7,377,208 B2 | * | 5/2008 | Ho et al. | 99/342 |
| 2003/0169801 A1 | * | 9/2003 | Chilton | 374/142 |
| 2004/0184511 A1 | * | 9/2004 | Kwon | 374/208 |
| 2006/0225502 A1 | * | 10/2006 | Ferron | 73/322 |
| 2007/0237203 A1 | * | 10/2007 | Gipson | 374/150 |
| 2008/0022861 A1 | | 1/2008 | Ferron | |
| 2011/0268153 A1 | | 11/2011 | He et al. | |

FOREIGN PATENT DOCUMENTS

| | | |
|---|---|---|
| DE | 102007058691 A1 | 6/2009 |
| EP | 1889561 A2 | 2/2008 |
| EP | 2361538 A1 | 8/2011 |

OTHER PUBLICATIONS

IT Search Report dated Jun. 20, 2012 for priority application No. IT MI2011A002356.
Wikipedia, Energy Harvesting, URL: < http://en.wikipedia.org/wiki/Power_harvesting#Thermoelectrics >, retrieved from the Internet Dec. 12, 2012.

(Continued)

*Primary Examiner* — Mirellys Jagan
(74) *Attorney, Agent, or Firm* — Novak Druce Connolly Bove + Quigg LLP

(57) ABSTRACT

A food cooking container provided with an electronic temperature monitoring device, the electronic temperature monitoring device being powered by converting thermal energy into electrical energy by the parasitic exploitation of temperature differences generated between the hot container and a heat dissipating metal mass, and activates a device in the form of a piezoelectric buzzer or LEDs, to indicate pre-set safety temperature limits. The electronic temperature monitoring device includes an electronic thermoelectric harvesting sensor for converting thermal energy into electrical energy via its electronic thermoelectric harvesting system.

11 Claims, 5 Drawing Sheets

(56) References Cited

OTHER PUBLICATIONS

Wikipedia, Thermocouples, URL: < http://en.wikipedia.org/wiki/Thermocouples >, retrieved from the Internet Dec. 12, 2012.
*Thermoelectric Energy Harvesting*, Micropelt GmbH, Freiburg Germany, URL: <www.micropelt.com >, retrieved from the Internet Dec. 21, 2012.
MPG-D651 MPG_D751 Thin Film Thermogenerators and Sensing Devices, Micropelt GmbH, Freiburg Germany, URL: <http://www.micropelt.com/down/datasheet_mpg_d651_d751.pdf>, retrieved from the Internet Dec. 21, 2012.
*What is MEMS Technology?*, URL: < https://www.mems-exchange.org/MEMS/what-is.html>, retrieved from the Internet Dec. 21, 2012.
Global Component Sourcing homepage, URL: < http://www.gcshk.net/>, retrieved from the Internet Dec. 21, 2012.
*Welcome to RS Components, Heat-Pump, thermoelectric, Peltier*, 9.3W, PE-031-10-13, URL: < http://australia.rs-online.com/web/p/thermo-electric-modules-peltier-effect/4901266/ >, retrieved from the Internet Dec. 21, 2012.
TE-Module RS drawing, URL: < http://docs-asia.electrocomponents.com/webdocs/091a/0900766b8091addd.pdf >, retrieved from the Internet Dec. 21, 2012.
Specification, product : Thermoelectric Module, TE module Part No. PE-031-10-13, SPC, issued May 29, 2008; URL: < http://pdf1.alldatasheet.com/datasheet-pdf/view/254255/ETC2/PE-031-10-13.html>, retrieved from the Internet Dec. 21, 2012.

\* cited by examiner

FOOD COOKING CONTAINER PROVIDED WITH A THERMAL INDICATOR

CROSS-REFERENCE TO RELATED APPLICATIONS

This application claims priority under 35 USC 119 from Italian Patent Application No. MI2011A002356, filed on Dec. 22, 2011, incorporated herein by reference.

FIELD OF THE INVENTION

The invention relates to a container, used for food cooking, for which container a utilization safety condition is to be achieved.

It is well known that a cooking means can be forgotten on the heat source and that such an event could cause excessive heating, with the danger of fire and damage during food cooking, and damage to the vessel itself.

BACKGROUND OF THE INVENTION

Usually, commercially available utensils used for food cooking present different devices used as temperature indicators.

These indicators are incorporated into the container handles and are intended to provide information regarding the cooking temperature attained or a temperature relating to utensil handling safety on termination of cooking.

Known temperature indicator means present in cooking vessels present coverings containing thermochromatic pigments or liquid crystals, which vary in colour according to the temperature assumed by the pan.

Temperature indicators have also been conceived containing electronic circuits powered by batteries and used to indicate the attained temperature by digital signals, light signals or acoustic signals.

Known temperature indicator systems in food cooking containers have the drawback that if thermochromatic pigments are applied, these lose effectiveness over time due to repeated vessel cleaning.

Battery powered devices have problems relating to device safety, because of evident battery explosion danger when exposed to the heat of the vessel, with consequent food contamination, in addition to maintenance and disposal costs.

Other recently known temperature indicator devices have the drawback of requiring handles of special size and shape containing seats shaped to match the shape of the indicator device.

This fact requires the formation of suitable moulds for handle manufacture, hence increasing the final product cost.

Moreover, this permanent incorporation of temperature indicator devices, in particular those battery powered, can generate problems of impermeabilization or heat resistance when, for example, the cooking vessel is cleaned in a dishwasher.

A further limit of devices pertaining to the prior art is the fact that for each cooking vessel, for example a frying pan, a saucepan or another container, an indicator device has to be permanently mounted in the handle of each individual container, a fact which substantially increases the vessel cost.

EP2361538A1 and EP1889561, incorporated herein by reference, describe cooking vessels according to the preamble of the main claim.

SUMMARY OF THE INVENTION

The object of the invention is therefore to obviate the drawbacks and limits of the prior art by proposing a food cooking container, the handle of which holds an indicator device for the container temperature, the device being directly activated by utilizing the heat of the cooking container, using the temperature difference created between the heat source and a metal dissipation mass.

This object is attained by a food cooking container provided with an electronic temperature monitoring device, the electronic temperature monitoring device being powered by converting thermal energy into electrical energy by the parasitic exploitation of temperature differences generated between the hot container and a metal dissipation mass, and activating a device in the form of a piezoelectric buzzer or LEDs, to indicate preset safety temperature limits.

With a device of this type, an aperture can be provided in cooking container handles or handgrips, which can be easily formed in a manner totally independent of the handle shape. The sensor of the electronic device is inserted into this aperture and is brought into contact with a hot part of the cooking container at one end and with a metal dissipation mass constituting the cold part at the other end, hence enabling the temperature gradient of the hot pan/cold mass system to be utilized.

The heat originating from the vessel is used to feed the so-called electronic thermoelectric harvesting system which converts the thermal energy into electrical energy, used to generate acoustic or light signals.

In detail, it will be assumed that a low power system is used for temperature measurement, provided for example with a piezoelectric buzzer, to warn the user if the measured temperature exceeds a limiting threshold (alarm signal).

In the most simple solution, the electronic device can be conveniently formed without a microcontroller and possibly without energy storage elements.

In a convenient solution, particularly in relation to withstanding dishwasher action, the thermal indicator device can be made removable, and the removed device be used freely in combination with other cooking containers, provided with a similar conveniently disposed seat.

A further advantage of the device is that it can be easily fitted into a handle, because having no battery it only requires a waterproofing protection, which is simple to make.

BRIEF DESCRIPTION OF THE DRAWINGS

One embodiment of the device of the invention is described in greater detail hereinafter and illustrated in the accompanying drawings, which are provided by way of example only and in which.

DETAILED DESCRIPTION OF THE PREFERRED EMBODIMENTS

Figure 1:
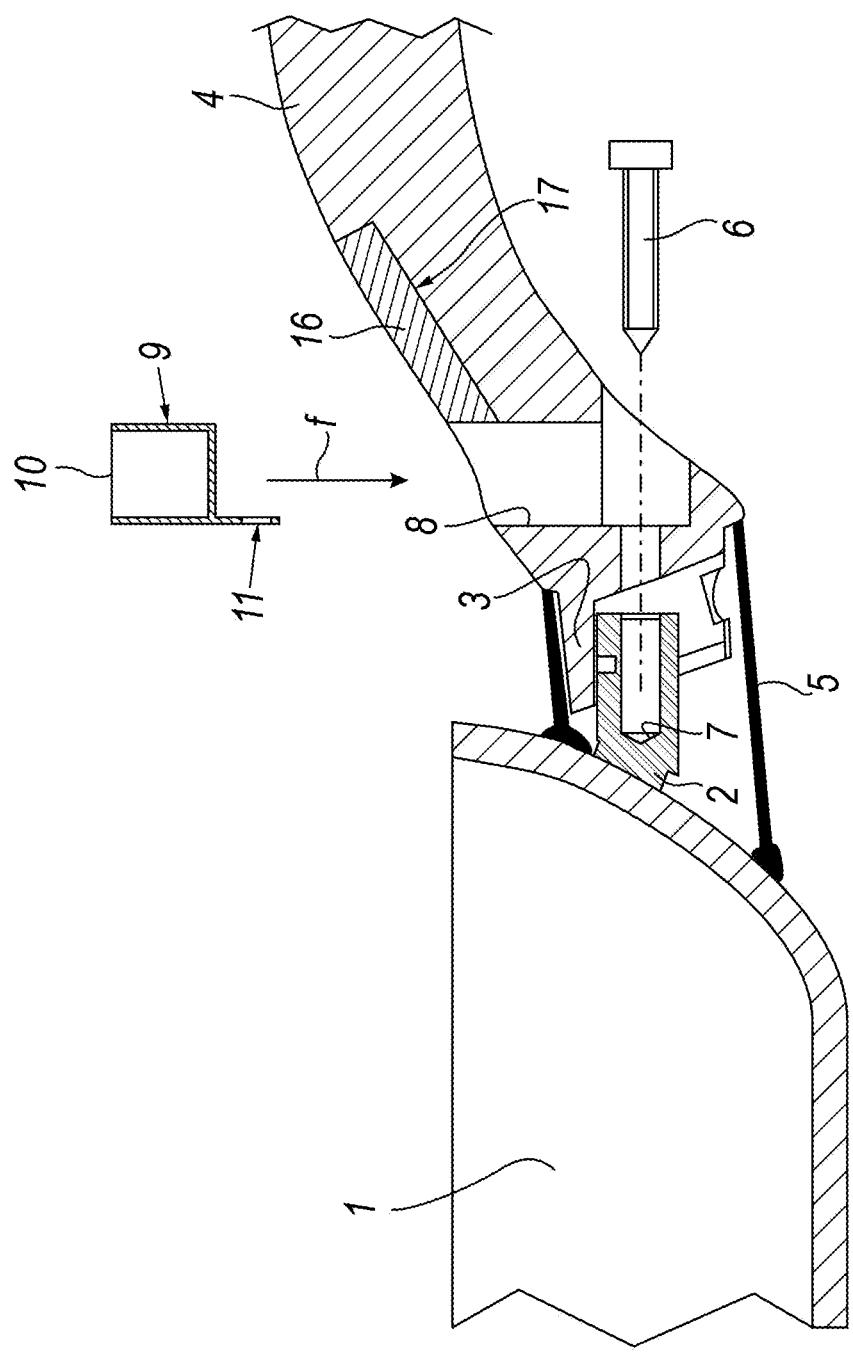
FIG. 1 shows schematically part of a frying pan with a handle provided with a seat for the insertion of a metal sheath.

As can be seen from FIG. 1, the food cooking container, for example a frying pan 1, presents a projecting fixing shank 2 forming a seat for the end 3 of a handle 4.

The end 3 is surrounded by a tubular piece 5 which is rigid with the body of the pan 1.

The handle 4 is locked in known manner with the aid of a screw 6 screwed into the threaded seat 7 of the shank 2.

The handle 4 presents an upwardly open seat 8 into which, as indicated by the arrow (f), a cup-shaped sheath 9 of metal construction presenting upperly an aperture 10 and lowerly a prolongation 11 can be inserted.

Figure 2:
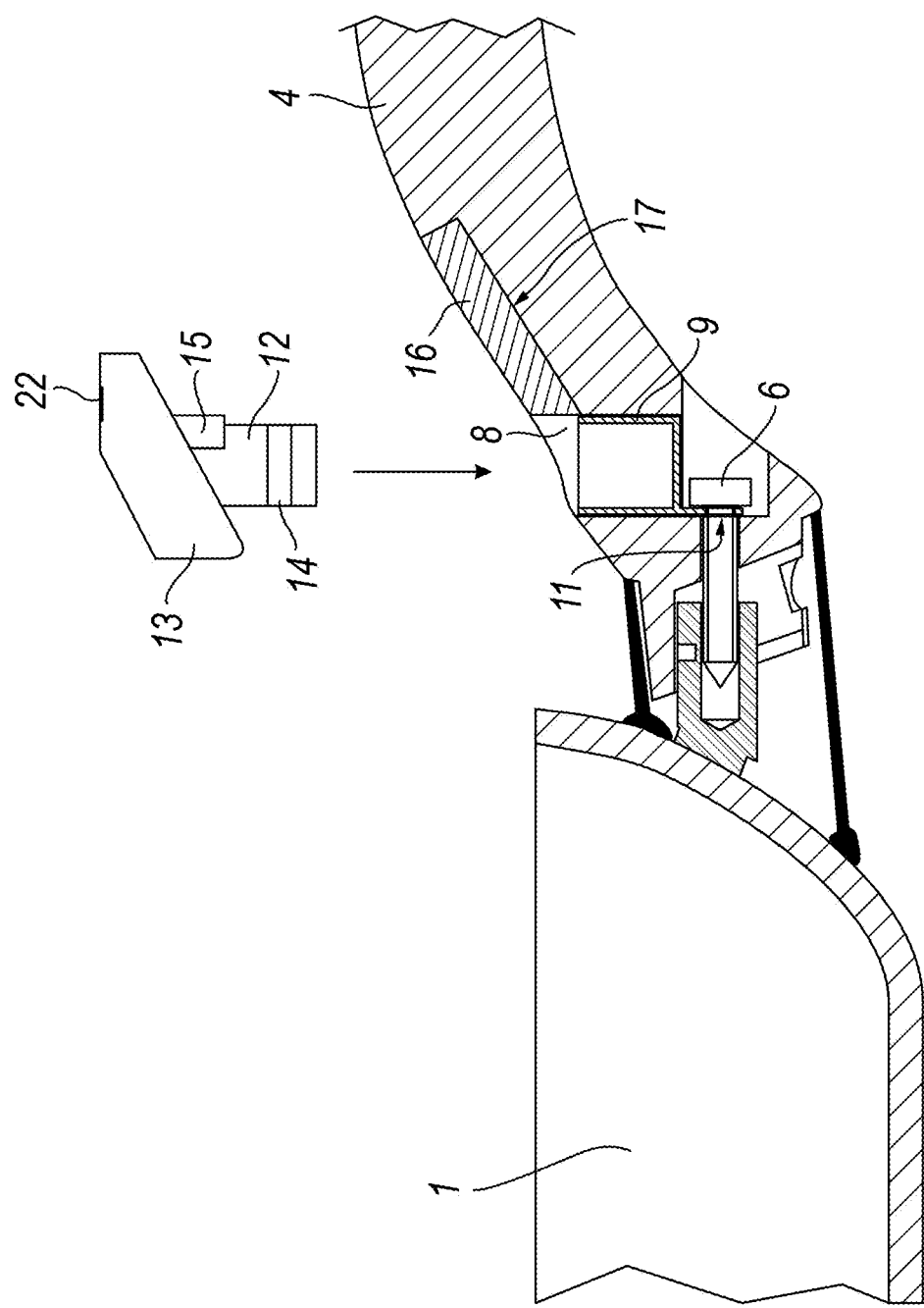
FIG. 2 shows the handle with a metal sheath inserted into the seat and locked by a screw.

From FIG. 2 it can be seen that the metal sheath 9 is inserted into the seat 8 of the handle 4 and the prolongation 11 of the sheath 9 is traversed by the fixing screw 6, this screw also acting as a means for transmitting the heat originating from the body of the pan 1. In practice, said prolongation 11 forms the hot terminal of the device.

From FIG. 2 it can be seen that above the handle 4 and above the seat 8 a stem 12 of the measurement and indicator device is shown, indicated overall by 13, this stem 12 presenting a circumferential band 14 provided with sensors able to receive from the sheet metal sheath 9 the heat originating from the container 1, to hence create a heat flow which feeds the thermoelectric converter.

The stem 12 presents a contact zone 15 which interacts with the cold terminal 16.

The cold terminal 16 consists of a small metal mass of adequate weight and dissipative capacity, preferably of heat conducting material such as aluminium, located in a suitable recess 17 distant from the heat source.

The thermal gradient generated by the contact surfaces 14 and 15 is used by the thermal energy conversion device to generate a potential difference by thermoelectric means.

This potential difference produces energy to power the measurement and indicator electronics (for example a piezoelectric buzzer or LEDs) 22 able to indicate the attainment of a predetermined limiting temperature, for example 300° C.

The device for converting thermal energy into electrical energy by an Energy Harvesting (EH) technique (the so-called electronic thermoelectric harvesting system which converts the thermal energy into electrical energy, used to generate acoustic or light signals) is a semiconductor thermoelectric generator in MEMS (Micro Electrical Mechanical System) technology, allowing to transfer the thermal power from a hot element (hot pole or terminal) to a thermal storage element (cold pole or terminal).

The hot side of the thermoelectric device is mechanically and thermally connected to the pan in order to generate a thermal flow through the TEG (Thermo Electric Generator) generator and hence to generate electric power.

Such electric power is sent to a support electronics for managing the measuring, controlling and signalling indicators.

The cold side of the TEG thermoelectric device is connected to the thermal storage element (cold pole) and suitably is a metal mass (e.g. aluminium), in case in the shape of a dissipater, if necessary.

The following are two typical examples of suitable harvesting devices:

(1) MICROPELT MPG-D751 thermoelectric generator, described by *Thermoelectric Energy Harvesting*, Micropelt GmbH, Freiburg Germany, URL: <www.micropelt.com>, retrieved from the Internet Dec. 21, 2012 and MPG-D651 MPG_D751 Thin Film Thermogenerators and Sensing Devices, Micropelt GmbH, Freiburg Germany, URL: <http://www.micropelt.com/down/datasheet_mpg_d651_d751.pdf>, retrieved from the Internet Dec. 21, 2012, manufactured in MEMS technology. The disclosures of which are incorporated herein by reference. MEMS or Micro-Electro-Mechanical Systems is a technology that in its most general form can be defined as miniaturized mechanical and electro-mechanical elements (i.e., devices and structures) made using the techniques of microfabrication. See *What is MEMS Technology?*, URL: <https://www.mems-exchange.org/MEMS/what-is.html>, retrieved from the Internet Dec. 21, 2012. The disclosure of which is incorporated herein by reference.

(2) TEC (Thermo Electric Cooler) used in a Peltier cell TEG mode PE-031-10-13 model by Global Component Sourcing described by Global Component Sourcing homepage, URL: <http://www.gcshk.net/>, retrieved from the Internet Dec. 21, 2012; *Welcome to RS Components, Heat-Pump, thermoelectric, Peltier,* 9.3W, PE-031-10-13, URL: <http://australia.rs-online.com/web/p/thermo-electric-modules-peltier-effect/4901266/>, retrieved from the Internet Dec. 21, 2012; TE-MODULE RS drawing, URL: <http://docs-asia.electrocomponents.com/webdocs/091a/0900766b8091addd.pdf>, retrieved from the Internet Dec. 21, 2012; and Specification, product: Thermoelectric Module, TE module Part Number: PE-031-10-13, SPC, issued May 29, 2008, URL: <http://pdf1.alldatasheet.com/datasheet-pdf/view/254255/ETC2/PE-031-10-13.html>, retrieved from the Internet Dec. 21, 2012. The disclosures of which are incorporated herein by reference.

Figure 3:
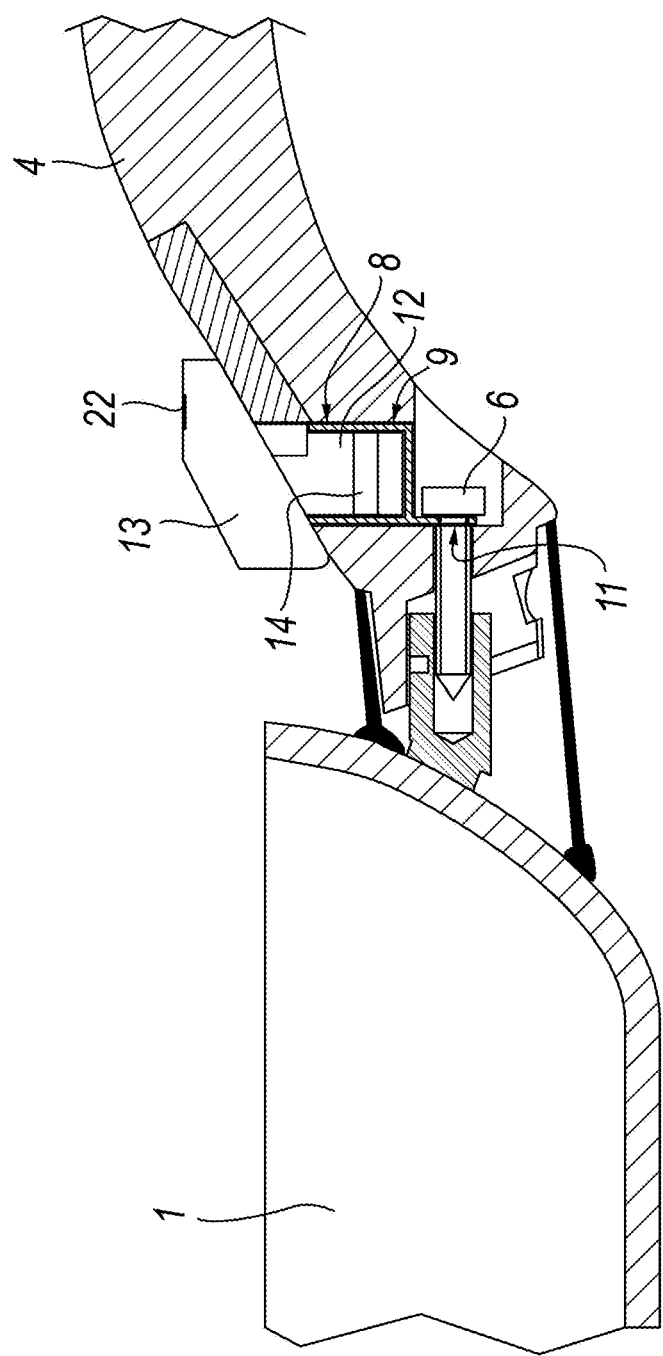
FIG. 3 shows the handle with the measurement device inserted into the metal sheath.

Although not shown, a battery and microchip can be incorporated into the device 13 of FIG. 2 or FIG. 3 if desired. If a battery (see for example the embodiment of FIG. 4) is present then the TEG charges the battery and the microchip can manage the charge of the battery and manage the activation of the piezoelectric buzzer or led 22, based on the temperature of the pan 1.

FIG. 3 shows the frying pan 1 with its handle 4, the lower end 11 of the metal sheath 9 being shown locked with the aid of the screw 6.

The stem 12 of the device 13 provided with the sensor zone 14 is inserted into the sheath 9, with the body of the analysis device 13 resting on the upper part of the handle 4.

The metal sheath 9 remains permanently fixed into the seat 8 of the handle 4, while the indicator device 12, 13, 14, in a convenient embodiment, is removable and is hence not influenced by moisture and detergents, for example during the wash stage.

The removed indicator and measurement device 12, 13, 14 can also be used for handles 4 of other containers 1 which are of appearance, shape and volume different from the container 1 shown in FIGS. 1, 2 and 3.

Figure 4:
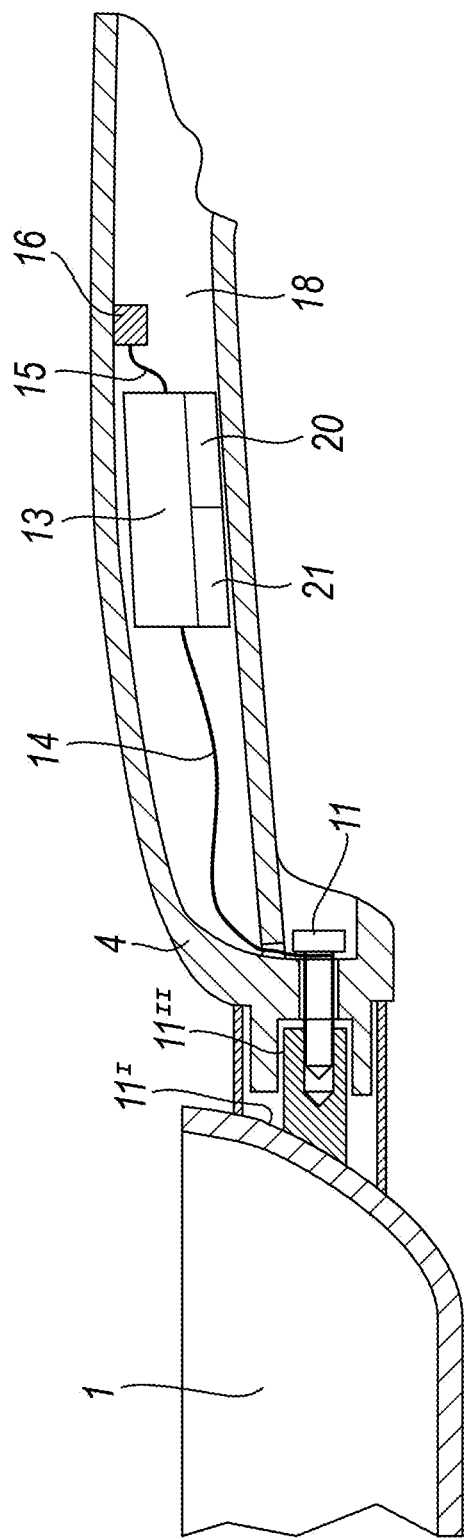
FIG. 4 shows an embodiment with the measurement device not removable.
Figure 5:
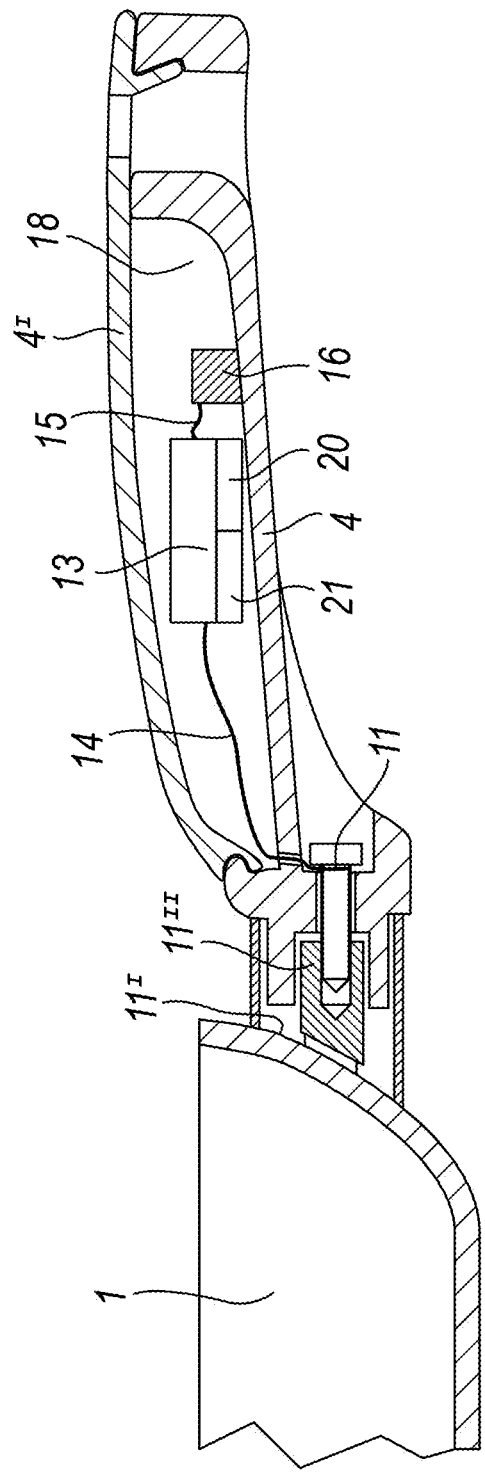
FIG. 5 shows a further embodiment with the measurement device not removable.

FIGS. 4 and 5 show by way of example two embodiments in which the electronic device 13 is left permanently on the body of the handle 4 on a compartment 18 provided for this purpose.

In the device of FIGS. 4 and 5 a battery 20 and microchip 21 are present. The TEG charges the battery 20 and the microchip 21 can manage the charge of the battery and manage the activation of the piezoelectric buzzer or led 22, based on the temperature of the pan 1.

In FIG. 5, the compartment 18 is closed by a cover $4^I$.

In these cases (FIGS. 4 and 5), the device compartment 18 must be made impermeable.

The hot thermal terminal 11 can also be located in the immediate vicinity of the edge $11^I$ of the container 1 or on an appendix $11^{II}$ thereof, depending on the available geometry.

The cold terminal 16 is located towards the end of the handle.

In all applications, the constituent metal mass 16 of the cold dissipation terminal can have knurls or fins to increase the heat transmission power.

The invention claimed is:

1. A food cooking container comprising:
a food cooking portion, a handgrip or handle functionally attached to the food cooking portion;

a heat dissipating metal mass comprising a cold terminal, a sheath defining a cavity and having a prolongation, the handgrip or handle containing a first recess for accommodating the sheath, and a second recess for accommodating the cold terminal, wherein the prolongation of the sheath is traversed by a fixing screw, the fixing screw located to receive heat originating from the food cooking portion of the food cooking container, the fixing screw together with the sheath acting as a hot terminal by the transmission of heat originating from the food cooking container through the screw to the sheath prolongation, an electronic temperature monitoring device, to be powered, by converting thermal energy into electrical energy by the parasitic exploitation of temperature differences generated between the hot terminal of the container and the cold terminal of the heat dissipating metal mass, and to activate a piezoelectric buzzer or LEDs, to indicate preset safety temperature limits, the electronic temperature monitoring device and the cold terminal being located in the interior of said handle recesses.

2. A food cooking container as claimed in claim 1, wherein the electronic temperature monitoring device is a temperature measurement and indicator device which is removable from the container handle.

3. A food cooking container as claimed in claim 1, wherein the electronic temperature monitoring device is a thermoelectric converter device provided with a microcontroller and with energy storage elements.

4. A food cooking container as claimed in claim 1, wherein the sheath is located in the first recess and the cold terminal is located in the second recess.

5. A food cooking container as claimed in claim 1, wherein the electronic temperature monitoring device comprises an electronic thermoelectric harvesting sensor for said converting of thermal energy into electrical energy by the parasitic exploitation of temperature differences generated between the hot terminal and the cold terminal of the heat dissipating metal mass, the sensor inserted into the first recess of the handle or handgrip of the cooking container;

one end of the sensor in contact with the hot terminal of the cooking container to be heated when the cooking container is employed for cooking, another end of the sensor in contact with the cold terminal of the metal dissipation mass.

6. A food cooking container as claimed in claim 5, wherein the electronic temperature monitoring device is an electronic thermoelectric harvesting sensor provided with a microcontroller and with energy storage elements.

7. A food cooking container comprising:

a food cooking portion, a handgrip or handle functionally attached to the food cooking portion;

a heat dissipating metal mass comprising a cold terminal, a sheath, the handgrip or handle containing a first recess for accommodating the sheath, and a second recess for accommodating the cold terminal, wherein the handle is attached to the food cooking portion by a fixing screw, the fixing screw acting as a hot terminal by the transmission of heat originating from the food cooking container through the screw, an electronic temperature monitoring device, to be powered, by converting thermal energy into electrical energy by the parasitic exploitation of temperature differences generated between the hot terminal of the container and the cold terminal of the heat dissipating metal mass, and to activate a piezoelectric buzzer or LEDs, to indicate preset safety temperature limits, the electronic temperature monitoring device and the cold terminal being located in the interior of said handle recesses.

8. A food cooking container as claimed in claim 7, wherein the electronic temperature monitoring device is a temperature measurement and indicator device which is removable from the container handle.

9. A food cooking container as claimed in claim 7, wherein the electronic temperature monitoring device is a thermoelectric converter device provided with a microcontroller and with energy storage elements.

10. A food cooking container as claimed in claim 7, wherein the electronic temperature monitoring device comprises an electronic thermoelectric harvesting sensor for said converting of thermal energy into electrical energy by the parasitic exploitation of temperature differences generated between the hot terminal and the cold terminal of the heat dissipating metal mass, the sensor inserted into the first recess of the handle or handgrip of the cooking container;

one end of the sensor in contact with the hot terminal of the cooking container to be heated when the cooking container is employed for cooking, another end of the sensor in contact with the cold terminal of the metal dissipation mass.

11. A food cooking container as claimed in claim 10, wherein the electronic temperature monitoring device is an electronic thermoelectric harvesting sensor provided with a microcontroller and with energy storage elements.

* * * * *